Feb. 2, 1971   R. T. BUNDORF   3,560,016
DIRIGIBLE WHEEL SUSPENSION INCLUDING MEANS FOR INDUCING
LATERAL ACCELERATION RESPONSE UNDERSTEER
Filed June 11, 1968   2 Sheets-Sheet 2
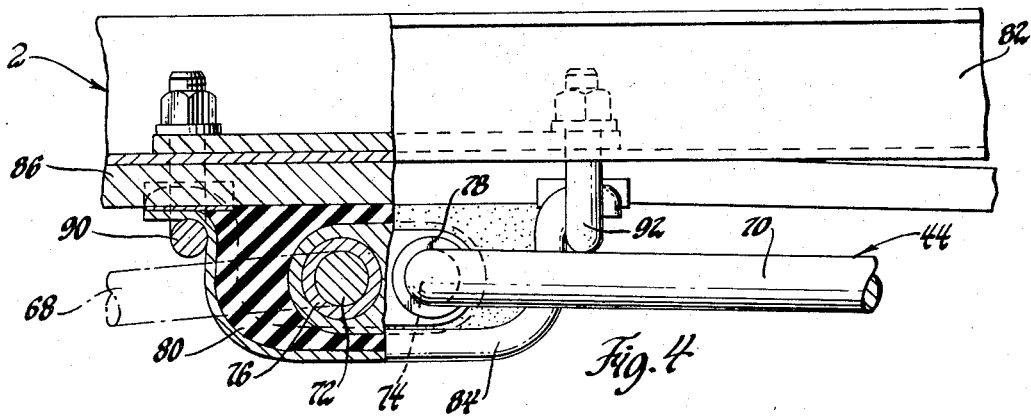
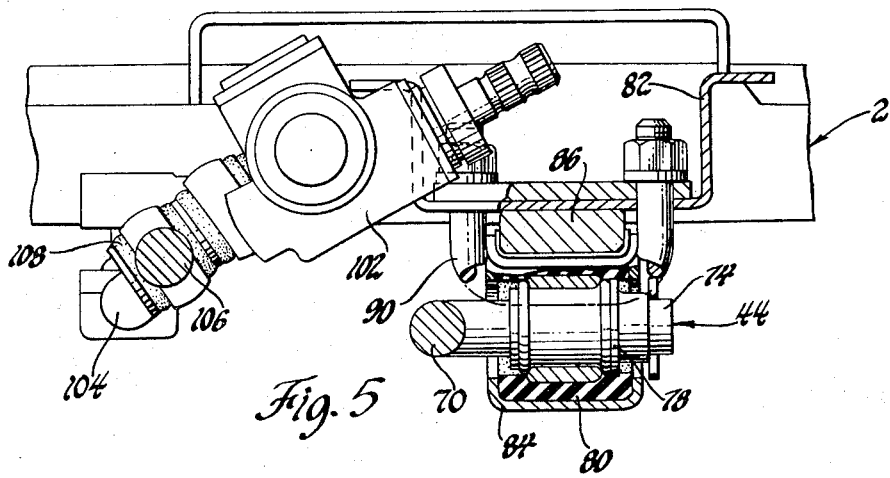
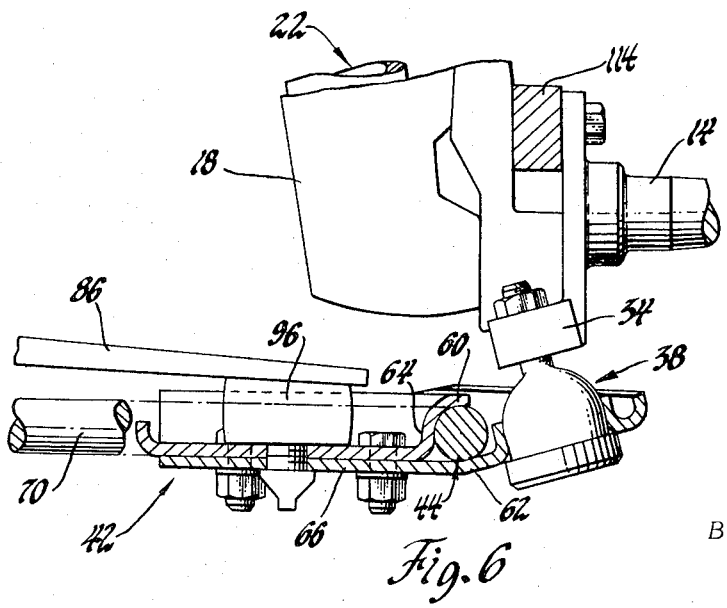
INVENTOR.
Ronald T. Bundorf
BY
W. H. Wagner
ATTORNEY

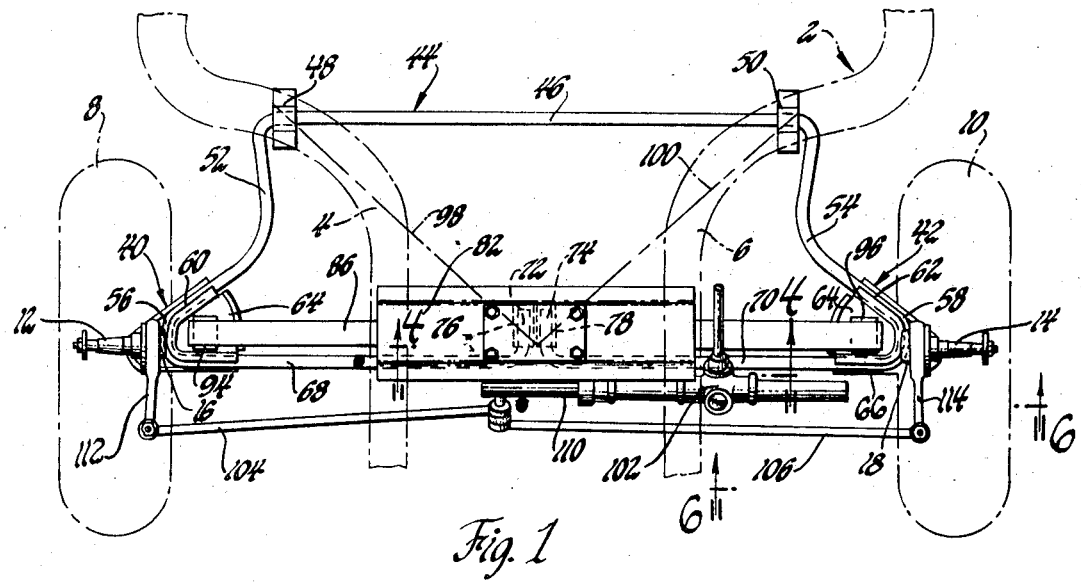

United States Patent Office 3,560,016
Patented Feb. 2, 1971

3,560,016
DIRIGIBLE WHEEL SUSPENSION INCLUDING MEANS FOR INDUCING LATERAL ACCELERATION RESPONSE UNDERSTEER
Ronald T. Bundorf, Royal Oak, Mich., assignor to General Motors Corporation, Detroit, Mich., a corporation of Delaware
Filed June 11, 1968, Ser. No. 736,157
Int. Cl. B60g 3/10
U.S. Cl. 280—96.2
2 Claims

ABSTRACT OF THE DISCLOSURE

A dirigible wheel suspension for vehicles in which transversely oppositely directed wheel deflection control arms are connected to the vehicle superstructure by pivot means permitting yieldable lateral translation of the wheels relative to the vehicle sprung mass responsive to centrifugal force acting on the vehicle. A steering mechanism mounted in a fixed position on the vehicle operatively engages the wheels via steering linkage connected to the wheels forwardly of their axis of dirigible movement so that a given steering angle of the wheels imposed by the steering mechanism progressively decreases as centrifugal force acting on the vehicle increases.

---

This invention relates to suspension construction for the dirigible wheels of a vehicle and more particularly, although not exclusively, to a suspension construction including means for inducing understeering response as an incidence of lateral acceleration of the vehicle.

In the prior art, the term "understeering" has usually connoted a response behavior of a vehicle in which forces excited by operation of the vehicle in a turn cause the vehicle to describe a turning radius of lesser magnitude than indicated by the steer angle of the dirigible wheels imposed by operator manipulation of the vehicle steering wheel. In a typical case, the planes of rotation of the rear wheels are caused to shift in a direction tending to steer the vehicle out of the turn which is otherwise indicated by the angular position of the front wheels. In the prior art, this type of response has been generally achieved in one of two general ways, i.e., geometric roll steer or deflection steer. In the former, the angular position of the rear wheels is caused to change as a geometric function of body roll occurring during a turn while in the latter the angular shift of the rear wheels is primarily a function of the lateral shifting of the sprung mass during a turning maneuver. In all cases, however, the understeering characteristic serves only to counteract the steering angle imposed on the dirigible front wheels of the vehicle by driver manipulation of the steering mechanism. The present invention, in contrast to the generally utilized systems in the prior art, is directed to a construction in which lateral acceleration imposed on the vehicle sprung mass as an incidence of cornering acts directly on the suspension for the dirigible wheels to decrease the actual steering angle of the front wheels thereby minimizing or eliminating the necessity for understeering rear wheel suspension characteristics.

An object of the present invention is to provide an improved dirigible wheel suspension for vehicles.

Another object is to provide a dirigible wheel suspension construction incorporating acceleration responsive understeering capability.

A further object is to provide a motor vehicle having suspension means at one end thereof which is susceptible to positive and negative steering input induced by driver imposed steering input and lateral acceleration of the vehicle, respectively.

The foregoing and other objects, advantages and features of the invention will become more readily apparent as reference is had to the accompanying specification and drawings wherein:

FIG. 1 is a partial plan view of a vehicle incorporating a suspension and steering mechanism in accordance with the invention;

FIG. 2 is a front elevational view of the construction shown in FIG. 1;

FIG. 3 is a side elevational view of the construction shown in FIGS. 1 and 2;

FIG. 4 is a greatly enlarged sectional front elevational view looking in the direction of arrows 4—4 of FIG. 1;

FIG. 5 is a greatly enlarged side elevational view partly in section, looking in the direction of arrows 5—5 of FIG. 2; and FIG. 6 is a greatly enlarged front elevational view looking in the direction of arrows 6—6 of FIG. 1.

Referring now to the drawings and particularly FIGS. 1 and 2, there is shown a vehicle in which the reference numeral 2 generally designates the sprung mass of the vehicle which includes box section side rails 4 and 6. Disposed at opposite sides of the forwardly projecting portions of side rails 4 and 6 are a pair of road wheels 8 and 10 which are rotatably mounted on wheel spindles 12 and 14. Spindles 12 and 14 are formed integrally on steering knuckles 16 and 18 which in turn are connected to generally vertically extending telescoping strut assemblies 20 and 22. At their upper ends, struts 20 and 22 are pivotally connected to brackets 24 and 26 secured on overlying pillar portions 28 and 30 of the vehicle superstructure 2.

Laterally outwardly from the axes of struts 20 and 22, knuckles 16 and 18 are formed with bosses 32 and 34 to which are operatively connected ball joint assemblies 36 and 38. Assemblies 36 and 38 in turn are secured to sandwich type sheet metal bracket assemblies 40 and 42 which form the outer end of wheel control arm structures shortly to be described. As seen best in FIG. 1, the vehicle superstructure has mounted thereon rearwardly of wheels 8 and 10 a one-piece spring bar 44 which includes a transverse portion 46 rotatably journalled at its opposite extremities in rubber bushed brackets 48 and 50. Outwardly of brackets 48 and 50, bar 44 extends forwardly to form laterally opposite outwardly swept leg portions 52 and 54 which extend in the direction of bracket assemblies 40 and 42. At their forward extremities, portions 52 and 54 are formed with bends 56 and 58 which conform with and are clamped in cooperating channels 60 and 62 formed in the upper and lower plates 64 and 66 of brackets 40 and 42. Upon emerging from brackets 40 and 42, continuation of bar 44 forms oppositely laterally inwardly extending leg portions 68 and 70, the terminal inner ends 72 and 74 of which are bent rearwardly in parallel relation and journalled in bearings 76 and 78.

As seen best in FIGS. 2 and 5, in accordance with one feature of the invention, bearings 76 and 78 are mounted in an elastic element 80 which in turn is secured to a transverse vehicle frame member 82 by a saddle bracket 84. Elastic element 80 enables yieldable lateral displacement of wheels 8 and 10 relative to the vehicle sprung mass 2, the purpose of which will shortly be described. Located vertically above elastic element 80 and displaced slightly rearwardly from leg portions 68 and 70 is a single leaf spring 86, the central portion 88 of which is rigidly secured to the frame by U-bolt assemblies 90 and 92. (As will be evident from FIG. 4, U-bolt assemblies 90 and 92 also support and retain the saddle bracket 84.) At its lateral opposite ends, spring 86 engages bearing pads 94 and 96 mounted on the upper surfaces of brackets 40 and 42, respectively.

When constructed and arranged in the manner described, it will be evident that the vehicle sprung mass 2 is supported relative to the dirigible wheels 8 and 10 by a compound elastic medium provided by bending deflection of leaf spring 86 and torsional deflection of the portions 52 and 54 of spring bar 44, while the deflection path of movement of the wheels is determined by the axis of swing defined by imaginary axes 98 and 100 and the telescoping axis of struts 20 and 22, the latter of which also serves to control caster and camber of the wheel during vertical deflection.

According to another feature of the invention, the vehicle is provided with a rack and pinion steering mechanism 102 which is fixedly mounted on the vehicle frame member 82 and operatively connected to the wheel spindle supports 16 and 18 by laterally oppositely directed steering links 104 and 106 which extend between the common output element 108 on rack 110 and forwardly projecting steering arms 112 and 114 formed on knuckles 16 and 18, respectively. Due to the fact that the steering output element 108 is fixedly secured to the rack portion 110 of the rack and pinion steering assembly, its lateral position is a direct function of steering wheel movement imparted by the vehicle operator. Hence, when the vehicle is moving in a straight ahead path, lateral shifting of the output member 108 responsive to displacement of rack 110 causes a positive correlated angular response of the dirigible wheels 8 and 10. However, upon entering a turn so initiated, centrifugal force commences to act on the vehicle causing the sprung mass to tend to shift laterally toward the outboard side of the turn. Since the wheels, within the limits of their tractive capability, concurrently tend to resist such lateral movement relative to the road, a resultant translation of the pivot bearings 76 and 78 within elastic element 80 occurs which is proportional to the degree of centrifugal force excited. As a result, even though precisely the same steering wheel position is maintained by the vehicle operator, the lateral position of the output member 108 shift along with the sprung mass and causes a corresponding angular movement of the steering arms 112 and 114 in a direction tending to reduce the initiated steering angle, thereby inducing an understeering condition which is proportional to the degree of lateral acceleration experienced. Hence, if the operator for any reason were to initiate a turn of excessive severity, the effect thereof is attenuated as a direct function of lateral acceleration of the vehicle. Naturally, as the vehicle is restored to a straight ahead direction of travel, lateral acceleration of the sprung mass progressively diminishes and the elastic element 80 restores the pivot bearings 76 and 78 to their normal positions at a corresponding rate, and the steering response of the wheels 8 and 10 again become exclusively a function of driver controlled steering input. It will, of course, be understood that the mounting of bearings 76 and 78 within elastic element 80 is symmetrical with respect to the vehicle centerline so that the foregoing mode of operation is identical with respect to a turn initiated in either direction.

While but one embodiment of the invention has been shown and described, it will be apparent that other changes and modifications may be made therein. It is, therefore, to be understood that it is not intended to limit the invention to the embodiment shown, but only by the scope of the claims which follow.

What is claimed is:

1. In a motor vehicle, a sprung mass, a pair of laterally spaced wheels dirigibly mounted on transversely directed wheel deflection control means connected to said sprung mass in a manner enabling limited yieldable relative lateral translation, said wheel deflection control means comprising a pair of laterally oppositely directed control arms pivotally mounted at their inboard ends to said sprung mass on generally longitudinal axes adjacent the vehicle longitudinal centerline, the inboard ends of said arms being pivotally mounted in an elastic mass formed and arranged to permit limited yieldable lateral translation of the axis of pivotable movement of said arms, a steering mechanism fixedly mounted on said sprung mass including linkage connected to said wheels at points spaced forwardly of the axes of dirigible movement thereof, whereby the steering angle of said wheels induced by actuation of said steering mechanism is progressively diminished proportional to relative lateral translation occuring between said sprung mass and said wheel deflection control means responsive to centrifugal force acting on said vehicle.

2. The invention of claim 1 including a transverse leaf spring fixedly secured vertically on said sprung mass and having opposite end portions overlying the extremities of said control arms.

References Cited

UNITED STATES PATENTS 3,181,883   5/1965   Kolbe _____ 280—112

FOREIGN PATENTS 498,024   1/1951   Belgium _____ 280—96.2
595,193   6/1959   Italy _____ 280—96.2

KENNETH H. BETTS, Primary Examiner

U.S. Cl. X.R.

267—23